UNITED STATES PATENT OFFICE.

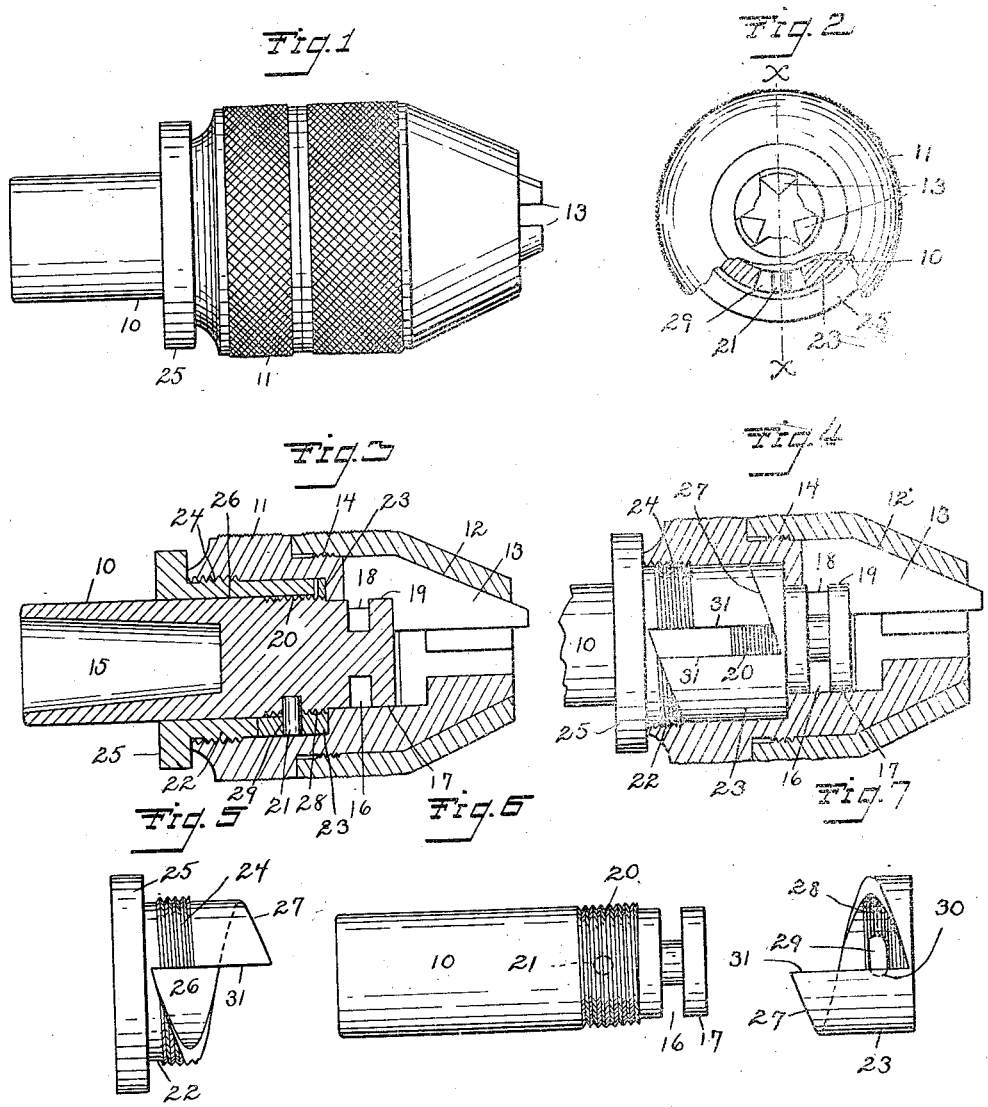

FRANK COBEY, OF EAST BERLIN, CONNECTICUT.

DRILL-CHUCK.

1,160,138.  Specification of Letters Patent.  Patented Nov. 16, 1915.

Application filed December 7, 1914. Serial No. 875,851.

*To all whom it may concern:*

Be it known that I, FRANK COBEY, a citizen of the United States, residing at East Berlin, in the county of Hartford and State of Connecticut, have invented certain new and useful Improvements in Drill-Chucks, of which the following is a specification.

My invention relates to improvements in drill chucks, and the object of my improvement is simplicity and economy in construction and convenience and efficiency in use.

In the accompanying drawing:—Figure 1 is a side elevation of my improved drill chuck. Fig. 2 is an end elevation of the same. Fig. 3 is a sectional view, on an enlarged scale, on the line $x\ x$ of Fig. 2. Fig. 4 is a similar view of the casing, the other parts being shown in side elevation. Fig. 5 is a side elevation of the inner cam member. Fig. 6 is a similar view of the spindle member. Fig. 7 is a similar view of the outer cam member.

My improved drill chuck comprises a spindle member 10 on the outer end of which is mounted a shell 11 having inclined ways 12 at the outer end in which are positioned jaws 13, and mechanism interconnecting the said spindle member, shell, and jaws whereby turning the shell relatively to the spindle member serves to open and close the jaws.

The shell 11 is made of two parts, connected by a screw thread connection 14.

The inner end of the spindle member may be provided with a recess 15 for an arbor or spindle.

The outer end of the spindle member 10 has a circular recess 16, forming a disk-like head 17 at the extreme outer end suitable to engage with the inner ends of the jaws 13, which are formed each with an inwardly directed lug 18 and a recess 19 fitting the said recess 16 and head 17.

The spindle member 10 is provided on the periphery of the body portion with a screw thread 20 that is relatively fine. The spindle member 10 is furthermore provided with a radial pin 21, positioned preferably at some part of the body portion traversed by the thread 20.

Intermediate the spindle member 10 and the shell 11 there is a space that is filled by two coöperating sleeve members, respectively an inner sleeve member 22 and an outer sleeve member 23, which have opposed edges 27 in abutment and formed as a single turn helix, or screw thread, of relatively steep pitch, and in the same direction of inclination on the axis as the thread 21, being both shown as right handed.

The inner sleeve member 22 is secured in the rear or base portion of the shell 11 by a screw thread connection 24, a flange 25 at the extreme inner end being in abutment with the inner end of the shell 11, so that the same is operatively fixed to the shell 11, and the same is provided with an axial bore 26 that is a fit for the body portion of the spindle member 10.

The outer sleeve member 23 has an internal thread 28 that is a fit for the thread 20 on the body portion of the spindle member 10 and is held on the said spindle member 10 by means of a hole or slot 29 engaged with the pin 21.

By providing a slot 29 in which the said pin may have a limited lateral movement in lieu of a hole that is a close fit for the pin the outer sleeve member 23 has a limited rotative movement on the spindle member 10 that I find to be of advantage in effecting the final clamping on the stock, and this is the preferred construction.

In operation, turning the shell 11 relatively to the spindle member 10 operates to turn the jaws, the inner ends of the latter being free to turn under pressure relatively to the head portion of the spindle member, and serves to change the relative position of the sleeve members 22 and 23, due to the engagement of these members along the outer, larger or coarser thread 27. The engagement of the sleeve members 22 and 23 as described serves to effect a relative longitudinal movement of the spindle member 10 and the shell 11, and this movement will be relatively great, due to the large pitch of the outer or shell thread 27. That is to say that a small angular movement operates to effect a relatively large longitudinal movement, and a correspondingly great movement of the jaws, either in opening or closing, depending upon the particular direction of the turning movement. During such turning, assuming the direction of the same to be right handed, so as to effect a closing of the jaws, the pin 21 will be in abutment with what may be termed the rear wall 30 of the slot 29, and is moved along the slot 29 in effecting the final grip. A reversal of the movement described serves to draw the pin 21 away from the rear wall 30, slightly corresponding to a slight movement of the outer sleeve member 23 on the spindle member 10, and at the same time effects a longitudinal movement of the shell 11, and spindle member 10 due to the effect of the outer thread 27 along which the sleeve members 22 and 23 meet as has been described. Accordingly, a relatively quick and large movement of the shell and spindle member is effected, resulting in a corresponding movement of the jaws, which result is due to the effect of the large or coarse thread 27 on the two opposed sleeve members.

The inner sleeve member 22 constitutes essentially a fixed part of the shell 11 and the outer sleeve member 23 constitutes essentially an enlargement of the body portion of the spindle member, the particular means of construction shown and described being simply one method of effecting the result mentioned, and other forms of construction within the scope of the appended claims may be used in some cases.

One way of describing the operation of my drill chuck is to say that the coarse thread makes up the distance and the fine thread is used for effecting the final tightening. In the first movement in making up the distance and before there is a gripping of the work there is no turning movement of the outer sleeve member on the spindle member, but after the gripping of the work by the jaws the resistance to longitudinal movement due to the gripping of the work operates in combination with the continued turning of the shell in the direction for clamping to turn the outer sleeve member on the spindle member, due to the engagement of the coarse thread portions of the two sleeve members, and during which movement the pin creeps away from the shoulder, traveling in the slot until the final gripping or clamping is effected. In gaining the distance as described the longitudinally directed shoulders 31 on the sleeve members become separated, and in the reverse movement these parts are brought together.

I claim as my invention:—

1. A chuck comprising a spindle member having a generally cylindrical body portion, an enlargement adjacent the outer end of the said body portion, and a head portion at the outer end, a shell inclosing the said body portion and head portion, and having internal inclined ways at the outer end, jaws positioned in the said ways, and engaged with the said head portion, a sleeve member fitting over the said body portion, opposed to the said enlargement, and fixedly connected to the said shell, and the opposed faces of the said sleeve member and enlargement being in the form of a helix.

2. A chuck comprising a spindle member having a cylindrical body portion provided with a relatively fine thread on the periphery and jaw engaging means at the outer end, a shell inclosing the said body portion in spaced relation thereto, and having jaw engaging means at the outer end, jaws engaged with the said shell and spindle member, sleeve members filling the space between the said shell and spindle member, one of the said sleeve members being secured to the inner end of the said shell and being a sliding fit for the said body portion, the other of the said sleeve members having a thread engaged with the said relatively fine thread, and having a transverse slot in the side wall, a pin extending radially from the side of the said body portion and positioned in the said slot and the said sleeve members having the opposed faces formed suitably to coöperate as end cams.

3. A chuck comprising a spindle member having an enlargement adjacent the free end and a shell member fitting the said enlargement, extending over the body portion of the said spindle member, and having a filling sleeve fitting over the said body portion and opposed to the said enlargement, and the opposed faces of the said enlargement and sleeve being in the form of coöperating cam faces.

FRANK COBEY.

Witnesses:
ARTHUR E. BOWERS,
LUTHER F. TURNER.